(12) United States Patent
Chang

(10) Patent No.: US 10,003,533 B2
(45) Date of Patent: Jun. 19, 2018

(54) SDN PACKET FORWARDING

(71) Applicant: Hangzhou H3C Technologies Co., Ltd., Hangzhou City (CN)

(72) Inventor: Huifeng Chang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 107 days.

(21) Appl. No.: 15/030,508

(22) PCT Filed: Oct. 23, 2014

(86) PCT No.: PCT/CN2014/089221
§ 371 (c)(1),
(2) Date: Apr. 19, 2016

(87) PCT Pub. No.: WO2015/058697
PCT Pub. Date: Apr. 30, 2015

(65) Prior Publication Data
US 2016/0277297 A1    Sep. 22, 2016

(30) Foreign Application Priority Data
Oct. 25, 2013   (CN) .......................... 2013 1 0511554

(51) Int. Cl.
*H04L 12/743* (2013.01)
*H04L 12/741* (2013.01)

(52) U.S. Cl.
CPC .......... *H04L 45/7453* (2013.01); *H04L 45/54* (2013.01)

(58) Field of Classification Search
CPC ... H04L 45/7453; H04L 45/54; H04L 67/327; H04L 69/22; H04L 47/2441;
(Continued)

(56) References Cited

U.S. PATENT DOCUMENTS

2013/0163426 A1* 6/2013 Beliveau ............... H04L 67/327
370/235
2013/0170495 A1* 7/2013 Suzuki ................ H04L 49/3009
370/392
(Continued)

FOREIGN PATENT DOCUMENTS

CN    101247337 A    8/2008
CN    101247353 A    8/2008
(Continued)

OTHER PUBLICATIONS

ONF TR-510, "The Benefits of Multiple Flow Tables and TPPs", all pages, Feb. 2, 2015.*
(Continued)

*Primary Examiner* — Jung Liu
(74) *Attorney, Agent, or Firm* — Hewlett Packard Enterprise Patent Department

(57) ABSTRACT

A method for forwarding a Software Defined Networking (SDN) packet, applied in a data forwarding device in a SDN network, comprising: dividing a flow table with a plurality of flow table entries according to a class in advance, and obtaining multi-layer flow tables serial in sequence; wherein each layer of flow table corresponds to a class of flow table; and receiving a SDN packet, searching each layer of flow table in sequence according to a precedence order of the multi-layer flow tables, or directly pointing to a specified flow table to search a matched flow table entry, and processing the SDN packet.

13 Claims, 3 Drawing Sheets

--- divide a flow table with a plurality of flow table entries according to a class in advance, and obtain multi-layer flow tables serial in sequence; each layer of flow table corresponds to a class of flow table — 11 receive a SDN packet, search each layer of flow table in sequence according to the precedence order of the multi-layer flow tables, or directly point to a specified flow table to search a matched flow table entry, and process the SDN packet — 12

(58) Field of Classification Search
CPC ..... H04L 45/745; H04L 45/38; H04L 43/028; H04L 43/026; H04L 43/0876; H04L 47/11; H04W 28/0215
See application file for complete search history.

(56) References Cited

U.S. PATENT DOCUMENTS

| | | | |
|---|---|---|---|
| 2013/0230047 A1* | 9/2013 | Subrahmaniam ... | H04L 47/2441 370/392 |
| 2013/0294249 A1* | 11/2013 | Lin .................. | H04L 43/028 370/236 |

FOREIGN PATENT DOCUMENTS

| | | |
|---|---|---|
| CN | 101582846 A | 11/2009 |
| CN | 102811227 | 12/2012 |
| CN | 102843299 | 12/2012 |
| CN | 102957603 | 3/2013 |
| CN | 103095583 | 5/2013 |
| CN | 103401783 A | 11/2013 |
| EP | 2482520 | 8/2012 |
| WO | WO-2013060378 A1 | 5/2013 |

OTHER PUBLICATIONS

ONF TS-015, "OpenFlow Switch Specification 1.3.3", all pages, Sep. 27, 2013.*

ONF TS-013, "OpenFlow Switch Specificatio 1.3.2", all pages, Apr. 25, 2013.*

"OpenFlow Switch Specification", Version 1.3.1 (Wire Protocol Ox04), Sep. 6, 2012, Open Networking Foundation.

International Search Report and Written Opinion dated Jan. 21, 2015, PCT Patent Application No. PCT/CN2014/089221 filed Oct. 23, 2014, The State Intellectual Property Office, P.R China.

Mendonca et al., "A Survey of Software-Defined Networking: Past, Present, and Future of Programmable Networks", Jun. 17, 2013.

* cited by examiner

SDN PACKET FORWARDING

CLAIM FOR PRIORITY

The present application is a national stage filing under 35 U.S.C. § 371 of PCT application number PCT/CN2014/089221, having an international filing date of Oct. 23, 2014, which claims priority to Chinese patent application number 201310511554.3, having a filing date of Oct. 25, 2013, the disclosures of which are hereby incorporated by reference in their entireties.

BACKGROUND

A typical Software Defined Networking (SDN) network includes a network controller in a control plane and a SDN switcher in a forwarding plane, respectively called as a controlling device and a data forwarding device. A method for forwarding a data packet in the SDN network utilizes a flow table for data packet forwarding. Specifically, the controlling device controls the data forwarding device by a standardized SDN protocol and distributes the flow table to the data forwarding device; the data forwarding device receives and stores the flow table; when the data packet is received from the network, the data forwarding device checks whether there is a matched flow table entry available in the flow table; if yes, the data forwarding device forwards the data packet according to an operation in the flow table entry; if no, the header information in the data packet is encapsulated as a Packet-in message to be sent to the controlling device through a secure channel, and then the controlling device decides the relevant behavior. OpenFlow is an example of one kind of switching technology, which can be used to establish the above-described SDN network.

DETAILED DESCRIPTION

In some existing Software Defined Networking switches, it may be complicated to store a flow table. For instance, in order to match a packet with a flow table, the packet is checked against all the data of the flow table, which may impact the efficiency of forwarding. For a large flow table, after each packet is received by the data forwarding device, all the flow table entries are traversed according to the priority ranking. If there is a large amount of data in the flow table, the efficiency of the algorithm would be much low.

The principle of the present disclosure is to design different classes of the flow table, and each layer of flow table corresponds with a class of flow table. In implementation, for a flow table with a plurality of flow table entries, the flow table entries sequentially ordered in the flow table with a same class are divided into a layer of flow table, and the whole flow table is divided into serial multi-layer flow tables.

Using the method in the present disclosure, a large flow table, which may be possible in the prior art, is divided to obtain multi-layer flow tables, and each layer of flow table has a class. When matching with a flow table after receiving a packet, it is not necessary to traverse and match the large flow table as processed in the prior art. Hence, the efficiency of flow table matching is highly improved.

Figure 1:
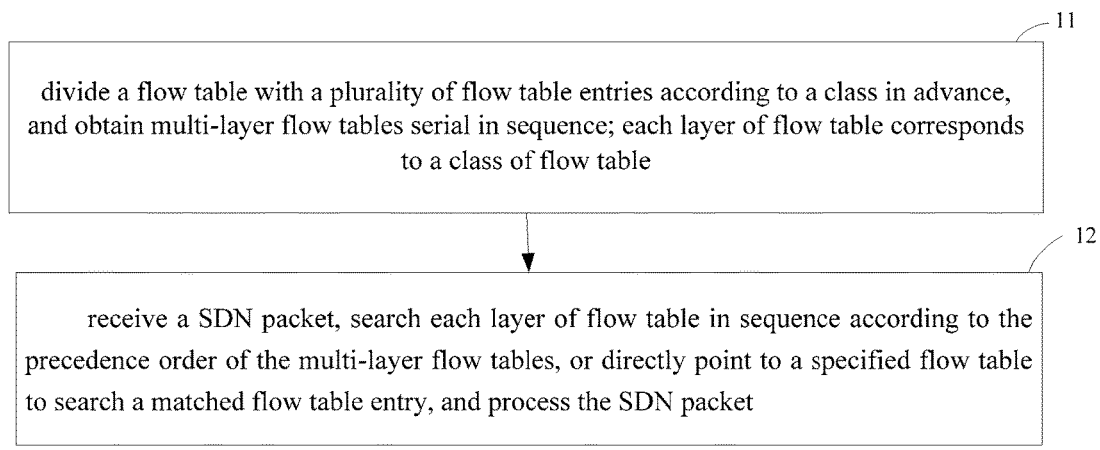
FIG. 1 is a flow diagram illustrating a method for forwarding a SDN packet according to an example of the present disclosure.

The present disclosure provides a method for forwarding a SDN packet, which can be applied to a data forwarding device in the SDN network. FIG. 1 is a flow diagram illustrating the method for forwarding the SDN packet according to an example of the present disclosure. As shown in FIG. 1, the method includes the following procedures.

At block 11, divide a flow table with a plurality of flow table entries according to a class in advance, and obtain multi-layer flow tables serial in sequence; each layer of flow table corresponds to a class of flow table.

In particular, different classes of flow tables correspond to different technologies of table entry matching. According to current implementation, a first class of flow table is established by a Radix tree, a second class of flow table is established by a Hash table or a Balanced Binary Search Tree (also named as AVL tree) or a Binary Sort Tree, and a third class of flow table is established by a Access Control List (ACL). Those classes herein are only examples for illustration. In implementation, the table entry attribute of the flow table can be used to determine a class to which the flow table belongs. Such class may be different from the above-described examples, which are not defined in the present disclosure.

For the first class of flow table, the first class of flow table entries established by a Radix tree have no matching priority, with a fixed matching domain, and the matching domain has a mask. The matching domain of such flow table entries may be an Internet Protocol (IP) address with a mask. Any flow table entries with an IP address with a mask and without matching priority can be distributed into the first class of flow table.

Due to the high matching efficiency, the Radix tree becomes a popular routing table structure. In present, searching for Radix tree routing table entries is generally performed by selecting a route with most exact matching under a longest prefix matching rule according to a destination IP address to be searched. Because in the present disclosure, the first class of flow table is established by the Radix tree, the searching method may follow the above. In addition, it may select a route with most coarse matching under a shortest prefix matching rule with respect to particular applications.

For the second class of flow table, the second class of flow table entries established by a Hash table or a AVL tree or a Binary Sort Tree have no matching priority, with a fixed matching domain, and the matching domain has no mask or has a mask with same length. The matching domain of such flow table entries may be a Media Access Control (MAC) address. Any flow table entries with an MAC address and without matching priority can be distributed into the second class of flow table. That is, the matching domains of the first class of flow table and the second class of flow table are both unique.

The matching domain of the second class of flow table entries may also be a port number, or an IP address without any mask, or an IP address with a same mask. Because the Hash algorithm cannot calculate a mask, but can achieve fast searching, such matching domain without any mask or with an IP address with a same mask can be distributed into the second class of flow table.

For the third class of flow table, the third class of flow table entries established by an ACL have a matching priority and a non-fixed matching domain. Such flow table entries are same as the existing ACL table, without any limits to the matching domain, and may correspond to different matching domains. For example, the third class of flow table has a flow table 1 with the priority of 1, matching domains being IP and MAC, a flow table 2 with the priority of 2, matching domains being IP, a flow table 3 with the priority of 3, matching domains being MAC, and a flow table 4 with the priority of 4, matching domains being a port number.

At block 12, receive a SDN packet, search each layer of flow table in sequence according to the precedence order of the multi-layer flow tables, or directly point to a specified flow table to search a matched flow table entry, and process the SDN packet.

Specifically, processing the SDN packet after receiving it may be performed based on the specification of a SDN protocol, e.g., by searching each layer of flow table in sequence according to the precedence order of the multi-layer flow tables, or directly pointing to a specified flow table to search a matched flow table entry. When searching each class of flow table, it may be done according to the specific way of establishment. For example, when searching the first class of flow table, the matched flow table entry may be rapidly searched by searching for the Radix tree routing table entries; when searching the second class of flow table, if it is established by a Hash table, the matched flow table entry may be rapidly searched by the Hash algorithm; when searching the third class of flow table, it may also be matched in sequence according to the priority ranking.

When searching the first class of flow table or the second class of flow table, it may use a method of searching Radix tree routing table entries, or use a Hash algorithm to achieve a fast and direct searching and matching. Especially for the first class of flow table or the second class of flow table, although there is no matching priority, the matching domain is unique, so that it is possible to achieve a fast matching. Hence, the efficiency of flow table matching is highly improved, and the mechanism for generating, matching or managing the flow table, etc. can be optimized.

It should be noted that, when matched with the flow table entries, the packet may be forwarded according to the match operation. For example, if the match operation refers to an out interface, the SDN packet will be forwarded at the corresponding out interface, then the matching ends; else if the match operation refers to next layer of flow table, it needs to continue to search subsequent flow tables.

Figure 2:
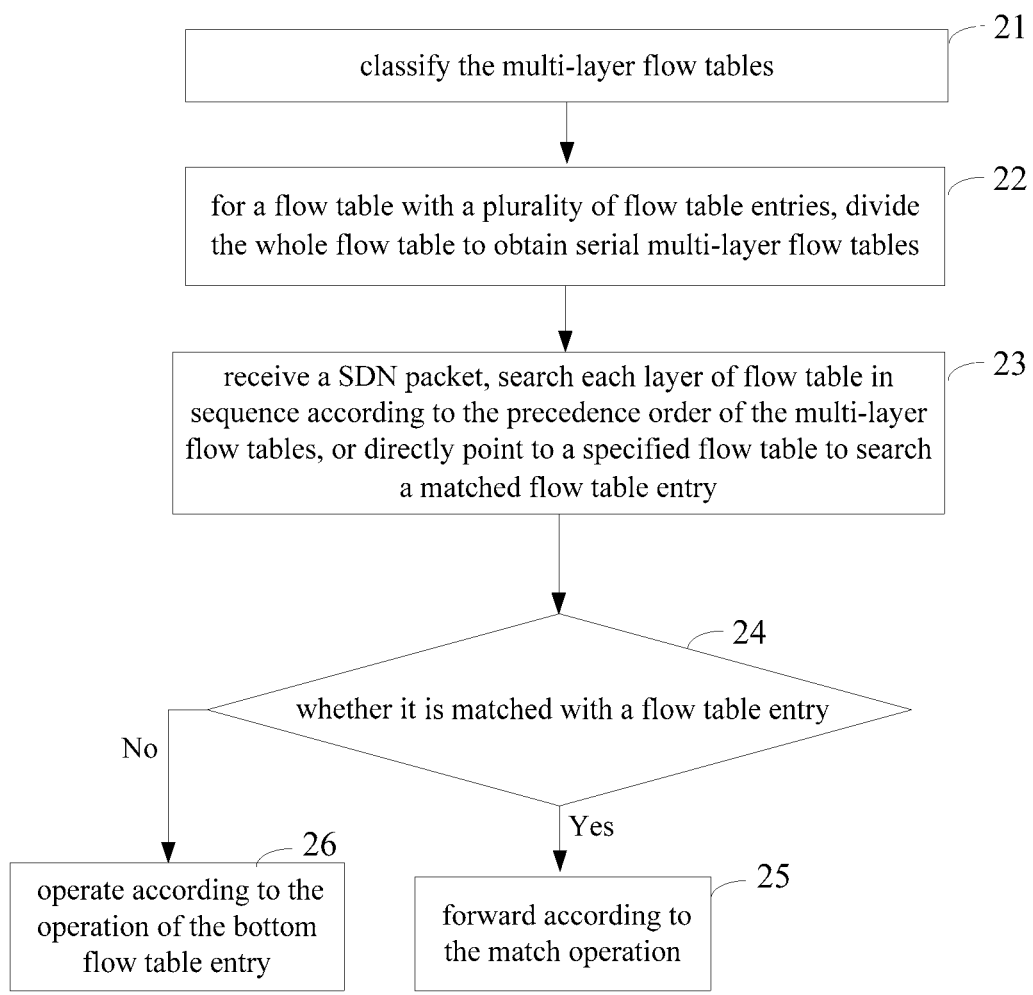
FIG. 2 is a flow diagram illustrating a method for forwarding a SDN packet according to another example of the present disclosure.

To make the present disclosure clear, the following example is used to describe the above method in detail. FIG. 2 is a flow diagram illustrating a method for forwarding a SDN packet according to another example of the present disclosure. As shown in FIG. 2, the method includes the following procedures.

At block 21, classify the multi-layer flow tables according to the table entry attribute of the flow table, such as the above-described three classes, i.e., the first class of flow table is established by a Radix tree, the second class of flow table is established by a Hash table or a AVL tree or a Binary Sort Tree, and the third class of flow table is established by an ACL.

In the present disclosure, classification of the multi-layer flow tables may be specified by the data forwarding device, or by the controlling device. When specified by the controlling device, the controlling device sends a message carrying the class of each layer of flow table to the data forwarding device, so as to classify the multi-layer flow tables with each layer of flow table corresponding to a class. When the class of flow table is the first class or the second class, the message may also carry the fixed matching domain corresponding to the first class of flow table or the second class of flow table.

When specified by the data forwarding device, a network administrator may configure a class corresponding to each layer of flow table in the data forwarding device. When the class of flow table is the first class or the second class, the flow table may be configured with a corresponding fixed matching domain.

At block 22, for a flow table with a plurality of flow table entries, divide the flow table entries sequentially ordered in the flow table with a same class into one layer of flow table, and the whole flow table is divided to obtain serial multi-layer flow tables.

Figure 3:
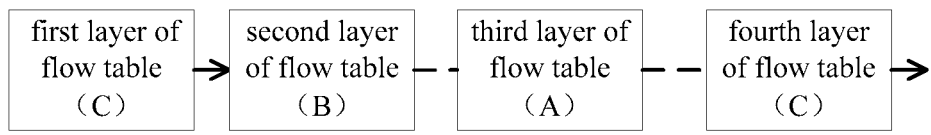
FIG. 3 is a schematic diagram illustrating dividing a flow table as multi-layer flow tables according to an example of the present disclosure.

FIG. 3 is a schematic diagram illustrating dividing a flow table as multi-layer flow tables according to an example of the present disclosure. In other words, those multi-layer flow tables originate from a single large flow table. Furthermore, the ranking order of flow table entries in each layer of flow table is the same as that in the original large flow table.

As shown in FIG. 3, there are serial four-layer flow tables. The first layer of flow table belongs to the third class (denoted as C); the second layer of flow table belongs to the second class (denoted as B); the third layer of flow table belongs to the first class (denoted as A); and the fourth layer of flow table belongs to the third class (denoted as C). In the example of the present disclosure, the first class of flow table and the second class of flow table are located between the third class of flow tables. As shown in FIG. 3, flow tables with different classes may be used in terms of combination of classes in any order. The specific combination may be based on the original large flow table.

It should be noted that, the second layer of flow table belonging to the second class (denoted as B) means that the matching domain divided into one flow table should be unique, and it is impossible to have a MAC address and a port number simultaneously, so that it is possible to achieve fast matching.

At block 23, receive a SDN packet, search each layer of flow table in sequence according to the precedence order of the multi-layer flow tables, or directly point to a specified flow table to search a matched flow table entry.

Assume in FIG. 3, the matching domain of the second class of flow table is a MAC address, and the matching domain of the third class of flow table is an IP address with a mask. When a SDN packet is received, each layer of flow table is searched in sequence according to the precedence order of the multi-layer flow tables. Thus, when a SDN packet is received, the first class of flow table is first searched in sequence according to the priority ranking for matching; then, the second class of flow table is searched according to the Hash algorithm; next, the third class of flow table is searched according to the method of searching for the Radix tree routing table entries; at last, the fourth class of flow table is searched in sequence according to the priority ranking, until a matched table entry is searched. Because a flow table is constituted by a same class of flow table entries with a corresponding fast searching method, the efficiency for flow table matching is highly improved compared with the traversing and matching in the prior art.

In addition, it may specify a flow table for the received SDN packet, and directly point to the specified flow table to search a matched flow table entry.

At block 24, determine whether the received SDN packet is matched with a flow table entry; if yes, perform block 25; otherwise, perform block 26.

At block 25, forward the SDN packet according to the match operation when it is matched with a flow table entry. If the match operation refers to an out interface, the SDN packet will be forwarded at the corresponding out interface, then the matching ends.

At block 26, configure a bottom flow table entry for each layer of flow table. For the packet unmatched with any flow table entries, operate according to the operation of the bottom flow table entry, including continuing to search subsequent flow tables, discarding, or sending it to the controlling device, etc. The bottom flow table entry is used to indicate the default operations when the packet is not matched with any other table entries.

In the present disclosure, a flow table with a plurality of flow table entries is divided according to a class in advance to obtain multi-layer flow tables serial in sequence; when a SDN packet is received, each layer of flow table is searched in sequence according to the precedence order of the multi-layer flow tables, or directly point to a specified flow table to search a matched flow table entry, and process the SDN packet. Because in the present disclosure, a large flow table, possibly available in the prior art, is divided into multi-layer flow tables, and each layer of flow table has a class. When matching a packet with a flow table, it is not necessary to traverse and match a large flow table as processed in the prior art. Rather, when searching a first class of flow table or a second class of flow table, it may use a method of searching for Radix tree routing table entries, or use a Hash algorithm to achieve a fast and direct searching and matching. Hence, the efficiency of flow table matching is highly improved, and the flow table database stored in the data forwarding device becomes more organized, and the flow table classes may be updated flexibly according to extension of the SDN protocol.

Figure 4:
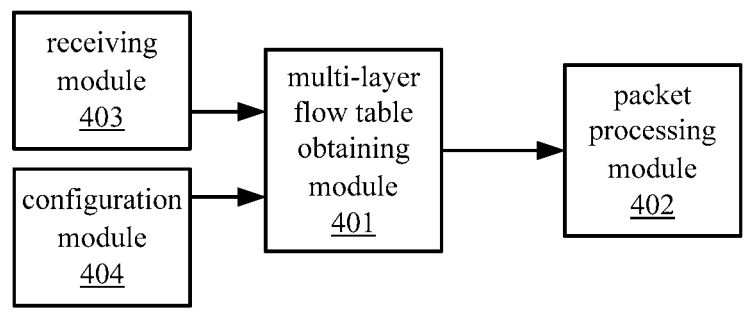
FIG. 4 is a schematic diagram illustrating a structure of a data forwarding device applying the above-described method according to an example of the present disclosure.

Based on the same principle, the present discourse also provides a data forwarding device. FIG. 4 is a schematic diagram illustrating a structure of a data forwarding device applying the above-mentioned method according to an example of the present disclosure. The data forwarding device includes:

a multi-layer flow table obtaining module 401, configured to divide a flow table with a plurality of flow table entries according to a class in advance, and obtain multi-layer flow tables serial in sequence; each layer of flow table corresponds to a class of flow table;

a packet processing module 402, configured to receive a SDN packet, search each layer of flow table in sequence according to the precedence order of the multi-layer flow tables, or directly point to a specified flow table to search a matched flow table entry, and process the SDN packet.

The flow table includes three classes, i.e., a first class of flow table established by a Radix tree, a second class of flow table established by a Hash table or a AVL tree or a Binary Sort Tree, and a third class of flow table established by an ACL.

The first class of flow table entries established by a Radix tree have no matching priority, with a fixed matching domain, and the matching domain has a mask.

The second class of flow table entries established by a Hash table or a AVL tree or a Binary Sort Tree have no matching priority, with a fixed matching domain, and the matching domain has no mask or has a mask with same length.

The third class of flow table entries established by an ACL have a matching priority and a non-fixed matching domain.

Flow tables with different classes may be used in terms of combination of classes in any order.

The data forwarding device further includes: a receiving module 403, configured to receive a message sent by the controlling device carrying the class of each layer of flow table, to classify the multi-layer flow tables in the multi-layer flow table obtaining module 401.

When the class of flow table is the first class or the second class, the message may also carry the fixed matching domain corresponding to the first class of flow table or the second class of flow table.

The data forwarding device further includes: a configuration module 404, configured to use configuration of the network administrator to classify the multi-layer flow tables in the multi-layer flow table obtaining module 401.

When the class of flow table is the first class or the second class, the flow table may be configured with a corresponding fixed matching domain.

Various modules in the above-described examples of the present disclosure may be implemented by a hardware processor (for example, an Application Specific Integrated Circuit (ASIC) or a Field Programmable Gate Array (FPGA), logic circuitry, or by a hardware processor such as a microprocessor or Central Processing Unit (CPU) executing machine readable instructions stored in a non-transitory storage medium, or a combination thereof.

Figure 5:
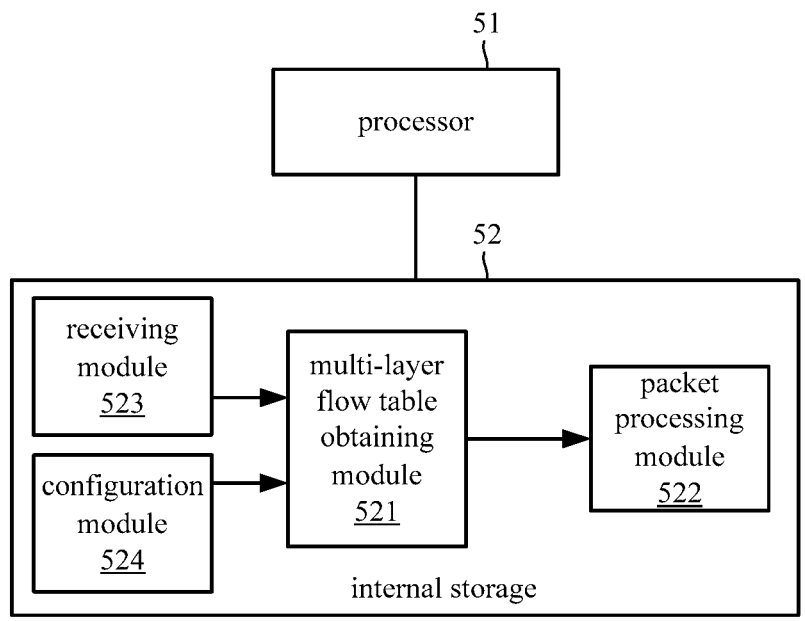
FIG. 5 is a schematic diagram illustrating a structure of a data forwarding device according to another example of the present disclosure.

FIG. 5 is a schematic diagram illustrating a structure of a data forwarding device according to another example of the present disclosure. As shown in FIG. 5, the data forwarding device includes a processor 51, and a non-transitory storage, e.g., an internal storage 52. The internal storage 52 includes a multi-layer flow table obtaining module 521, a packet processing module 522, a receiving module 523 and a configuration module 524.

The processor 51 is configured to communicate with the internal storage 52, and execute the instructions stored in the internal storage 52, including machine-readable instructions.

The multi-layer flow table obtaining module 521 is configured to store the machine-readable instructions. When the instructions are executed by the processor 51, the following is performed: dividing a flow table with a plurality of flow table entries according to a class in advance, and obtaining multi-layer flow tables serial in sequence; each layer of flow table corresponds to a class of flow table.

The packet processing module 522 is configured to store the machine-readable instructions. When the instructions are executed by the processor 51, the following is performed: receiving a SDN packet, searching each layer of flow table in sequence according to the precedence order of the multi-layer flow tables, or directly pointing to a specified flow table to search a matched flow table entry, and processing the SDN packet.

The receiving module 523 is configured to store the machine-readable instructions. When the instructions are executed by the processor 51, the following is performed: receiving a message sent by the controlling device carrying the class of each layer of flow table, to classify the multi-layer flow tables in the multi-layer flow table obtaining module 521.

The configuration module 524 is configured to store the machine-readable instructions. When the instructions are executed by the processor 51, the following is performed:

using configuration of the network administrator to classify the multi-layer flow tables in the multi-layer flow table obtaining module 521.

The foregoing is preferred examples of the present disclosure, which is not intended to limit the present disclosure. Any modifications, equivalents, and improvements made within the spirit and principle of the present disclosure should be covered by the scope of the present disclosure.

What is claimed is:

1. A method for forwarding a Software Defined Networking (SDN) packet, applied in a SDN data forwarding device, comprising:
   dividing a flow table with a plurality of flow table entries according to a class in advance, and obtaining multi-layer flow tables in sequence, wherein each layer of flow table corresponds to a class of flow table; and
   receiving a SDN packet, searching each layer of flow table in sequence according to a precedence order of the multi-layer flow tables, or directly pointing to a specified flow table to search a matched flow table entry, and processing the SDN packet.

2. The method according to claim 1, wherein the flow table comprises three classes, wherein a first class of flow table is established by a Radix tree, a second class of flow table is established by a Hash table or a Balanced Binary Search Tree (or a AVL tree) or a Binary Sort Tree, and a third class of flow table is established by an Access Control List (ACL);
   the first class of flow table entries established by a Radix tree have no matching priority, with a fixed matching domain, and a matching domain has a mask;
   the second class of flow table entries established by a Hash table or a AVL tree or a Binary Sort Tree have no matching priority, with a fixed matching domain, and a matching domain has no mask or has a mask with same length; and
   the third class of flow table entries established by an ACL have a matching priority and a non-fixed matching domain.

3. The method according to claim 2, wherein the multi-layer flow tables with different classes are used in terms of combination of classes in any order.

4. The method according to claim 2, further comprising: receiving a message sent by a controlling device carrying a class of each layer of flow table to classify the multi-layer flow tables, wherein when the class of flow table is the first class or the second class, the message further carries a fixed matching domain corresponding to the first class of flow table or the second class of flow table.

5. The method according to claim 2, further comprising: classifying the multi-layer flow tables by configuration of a network administrator, wherein when the class of flow table is the first class or the second class, the flow table is configured with a corresponding fixed matching domain.

6. The method according to claim 1, wherein searching each layer of flow table in sequence according to a precedence order of the multi-layer flow tables or directly pointing to a specified flow table to search a matched flow table entry and processing the SDN packet comprises:
   when the SDN packet is matched with a flow table entry, forwarding the SDN packet according to a match operation;
   when the SDN packet is not matched with any flow table entries, according to an operation of a bottom flow table entry configured in each layer of flow table, continuing to search a subsequent flow table, discarding the SDN packet, or sending the SDN packet to a controlling device.

7. A Software Defined Networking (SDN) data forwarding device, comprising:
   a multi-layer flow table obtaining module to:
      divide a flow table with a plurality of flow table entries according to a class in advance; and
      obtain multi-layer flow tables in sequence, wherein each layer of flow table corresponds to a class of flow table; and
   a packet processing module to:
      receive a SDN packet;
      search each layer of flow table in sequence according to a precedence order of the multi-layer flow tables or directly point to a specified flow table to search a matched flow table entry; and
      process the SDN packet.

8. The data forwarding device according to claim 7, wherein the flow table comprises three classes, wherein a first class of flow table is established by a Radix tree, a second class of flow table is established by a Hash table or a Balanced Binary Search Tree (or a AVL tree) or a Binary Sort Tree, and a third class of flow table is established by an Access Control List (ACL);
   the first class of flow table entries established by a Radix tree have no matching priority, with a fixed matching domain, and a matching domain has a mask;
   the second class of flow table entries established by a Hash table or a AVL tree or a Binary Sort Tree have no matching priority, with a fixed matching domain, and a matching domain has no mask or has a mask with same length; and
   the third class of flow table entries established by an ACL have a matching priority and a non-fixed matching domain.

9. The data forwarding device according to claim 8, wherein the multi-layer flow tables with different classes are used in terms of combination of classes in any order.

10. The data forwarding device according to claim 8 comprising:
    a receiving module to:
       receive a message sent by a controlling device carrying a class of each layer of flow table to classify the multi-layer flow tables; and
    in response to the class of flow table including the first class or the second class, the message carries a fixed matching domain corresponding to the first class of flow table or the second class of flow table.

11. The data forwarding device according to claim 8 comprising: a configuration module to:
    use configuration of the network administrator to classify the multi-layer flow tables in the multi-layer flow table obtaining module, wherein when the class of flow table is the first class or the second class, the flow table is configured with a corresponding fixed matching domain.

12. The data forwarding device according to claim 7, wherein the packet processing module is to:
    when the SDN packet is matched with a flow table entry, forward the SDN packet according to a match operation;
    when the SDN packet is not matched with any flow table entries, according to an operation of a bottom flow table entry configured in each layer of flow table, continue to search a subsequent flow table, discard the SDN packet, or send the SDN packet to a controlling device.

13. A Software Defined Networking (SDN) packet forwarding device, comprising:
- a non-transitory storage medium;
- a processor; and
- machine readable instructions stored in the non-transitory storage medium and executable by the processor, the instructions to:
- divide a flow table with a plurality of flow table entries according to a class in advance, and obtain multi-layer flow tables in sequence, wherein each layer of flow table corresponds to a class of flow table;
- receive a SDN packet;
- search each layer of flow table in sequence according to a precedence order of the multi-layer flow tables or directly point to a specified flow table to search a matched flow table entry; and
- process the SDN packet.

* * * * *